United States Patent [19]
Dryburgh

[11] 3,975,654
[45] Aug. 17, 1976

[54] SHADED POLE MOTOR

[75] Inventor: Paul E. Dryburgh, Owosso, Mich.

[73] Assignee: Universal Electric Company, Owosso, Mich.

[22] Filed: Nov. 24, 1971

[21] Appl. No.: 201,950

Related U.S. Application Data

[63] Continuation of Ser. No. 55,068, July 15, 1970.

[52] U.S. Cl. .............................. 310/172; 310/182; 310/187; 310/190; 310/197
[51] Int. Cl.² ........................................ H02K 17/10
[58] Field of Search ........... 310/172, 166, 182, 186, 310/187, 190, 197

[56] References Cited
UNITED STATES PATENTS

| | | | |
|---|---|---|---|
| 2,810,845 | 10/1957 | Howes | 310/172 |
| 3,214,619 | 10/1965 | Vaske | 310/172 |
| 3,313,965 | 4/1967 | Arnold | 310/172 |

*Primary Examiner*—Mark O. Budd
*Attorney, Agent, or Firm*—Barnes, Kissellc, Raisch & Choate

[57] ABSTRACT

A shaded pole electric motor comprising a rotor, a stator. The stator has a plurality of generally radially extending poles each with a neck portion of lesser circumferential extent than the radially innermost ends of the poles. Adjacent neck portions of the poles form a kidney slot for receiving portions of stator windings. A main winding is wound around the neck portion of each pole. A shading coil slot which has its radially innermost end nearer the pole center than its radially outermost end. A shading coil and winding is positioned in such a manner that no portion of the main winding overlies the axially outer ends of the shading coil.

16 Claims, 7 Drawing Figures

INVENTOR
PAUL E. DRYBURGH
BY
Barnes, Kisselle, Raisch & Choate
ATTORNEYS

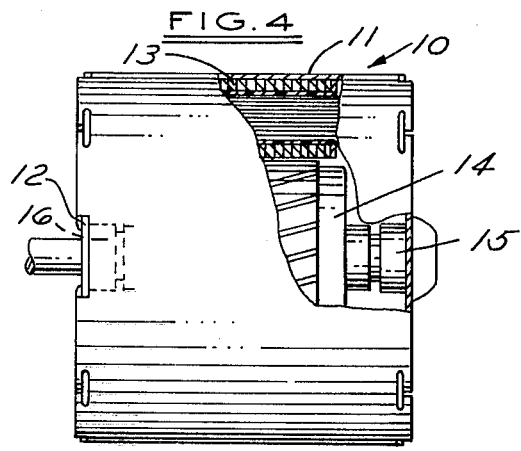
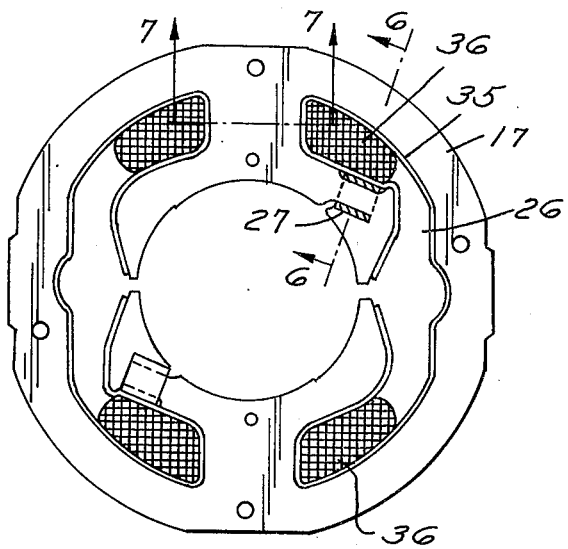
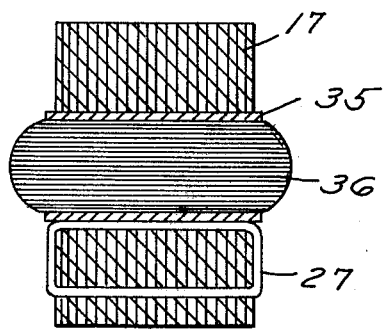
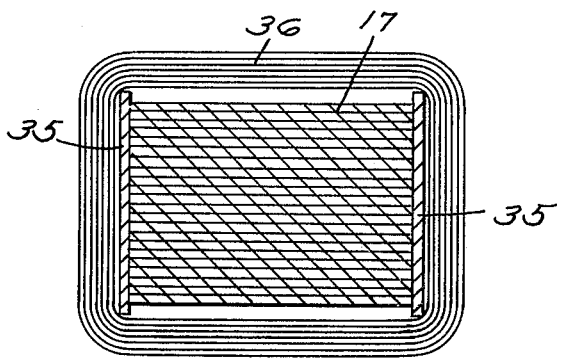

SHADED POLE MOTOR

This is a continuation of application Ser. No. 55,068, filed July 15, 1970.

This invention relates to a shaded pole electric motor.

BACKGROUND OF THE INVENTION

In conventional shaded pole electric motors, the stator comprises a plurality of poles which have main coils or windings wound thereabout and shading coils are wound about slots positioned in radially innermost ends of each pole. In such a construction, the shading coil slots conventionally extend from the interface of the stator and rotor radially toward the intermediate or neck or body portion of the pole and as a result the main coil winding overlies the shaded pole neck and shaded pole coil.

This necessitates a greater mean turn length than would be necessary if the main winding encompassed just the main pole neck.

Among the objects of the invention are to provide a shaded pole electric motor in which the amount of wire in the main coil is reduced; in which the mean turn or average diameter of the main coil is reduced without decreasing the cross section of the magnetic circuit; which motor has a lesser overall length; which motor has a construction such that there is a lesser tendency of the main coil to move toward the rotor after being wound; which motor has a construction such that there is a lesser tendency for the main winding to come into close proximity to the shading coil when using paper type of insulation, and which motor can utilize either epoxy or paper type insulation.

SUMMARY OF THE INVENTION

A shaded pole electric motor comprising a rotor, a stator. The stator has a plurality of generally radially extending poles each with a neck or body portion of lesser circumferential extent than the radially innermost ends of the poles. Adjacent neck portions of the poles form a kidney slot for receiving portions of stator windings. A main winding is wound around the main neck portion of each pole. A shaded pole slot extends from the interface or from a point in close proximity to the interface of the rotor and stator and is circumferentially spaced from the neck portion. A shaded pole winding is wound through the shaded pole slot in such a manner that the major portion and preferably the entire coil of the main winding does not overly the axially outer ends of the shading coil.

DESCRIPTION OF THE DRAWINGS

FIG. 4 is a part sectional side view of a motor embodying the invention.

FIG. 5 is an end view of a modified form of stator.

FIG. 6 is a sectional view taken along the line 6—6 in FIG. 5.

FIG. 7 is a sectional view on an enlarged scale taken along the lines 7—7 in FIG. 5.

DESCRIPTION

Figure 1:
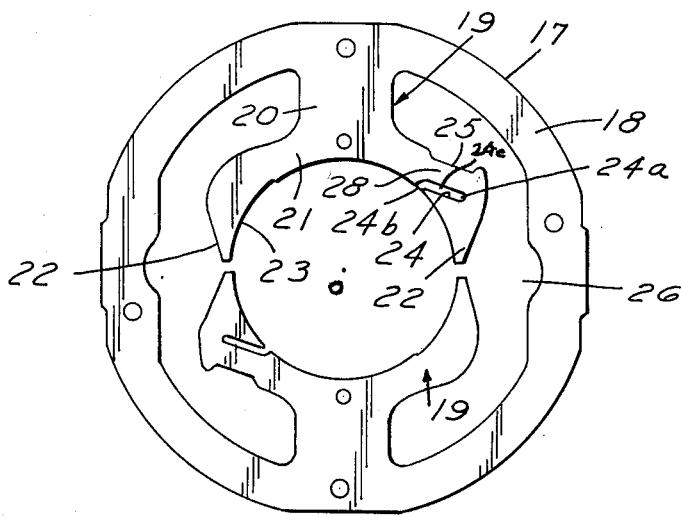
FIG. 1 is a plan view of a lamination utilized in the stator of the motor embodying the invention.

Referring to FIG. 4, the motor 10 embodying the invention is shown as being of the two-pole design, although the invention is also applicable to motors having a greater number of poles. The motor comprises a casing 11 with end caps 12. A stator 13 is provided within the casing and a rotor 14 is rotatably mounted by bearings 15, 16, stator 13 and rotor 14 having a cylindrical interface or air gap.

Figure 2:
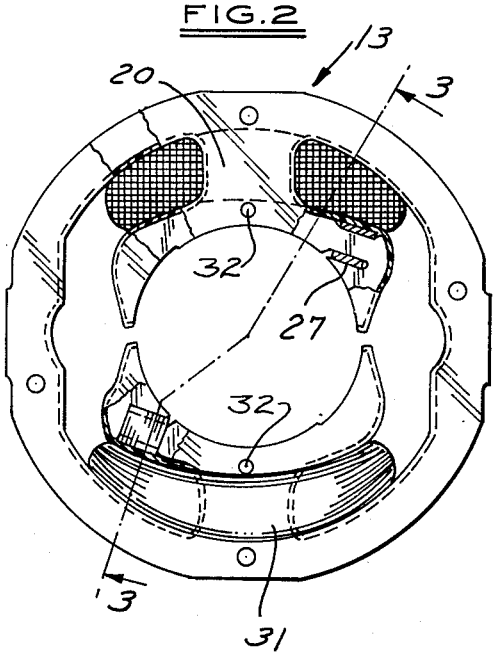
FIG. 2 is a part sectional end view of the stator embodying the invention.
Figure 3:
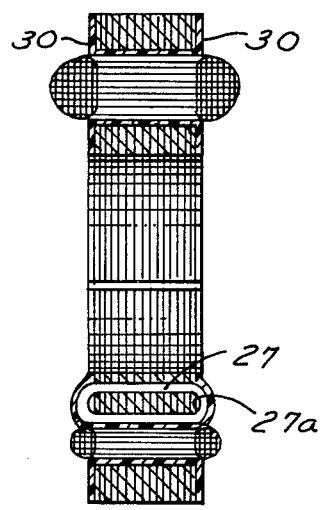
FIG. 3 is a sectional view taken along the line 3—3 in FIG. 2.

Referring to FIGS. 1–3, the stator 13 comprises a plurality of laminations 17 of substantially identical construction which are assembled together. Each lamination 17 includes an outer ring or yoke 18 and opposed poles 19. Each pole 19 includes a central or intermediate neck portion 20 and a radially innermost end 21 that has a greater circumferential extent or width than the neck portion 20. The portion 21 terminates in pole tips 22 and has an arcuate surface 23 at the interface with the rotor 14.

One of the pole tips 22 has a shading coil slot 24 therein that extends circumferentially away from the neck portion 20 such that a radial line bisecting, at center 24c, another line which runs down the center of the shading coil slot 24 from end 24b to end 24a, forms an angle 0-24c-24a which is obtuse.

Expressed in a different fashion, one of the pole tips 22 has a shading coil slot 24 therein that extends circumferentially away from the neck portion 20 such that the end of the shading coil slot 24 which is radially innermost is also that end which is circumferentially closest to the pole neck portion 20.

The tip 22 may include a portion 25 that is recessed adjacent what is commonly known as the kidney slot 26. A shading coil 27 in the form of a band is wrapped around the intermediate portion 28 of the tip 22 that is defined by the slot 24 and recess 25 and the ends of the shading coil are welded, soldered or otherwise attached to one another. The axially outermost end surfaces of the stator and the inner surfaces of the kidney slot 26 are provided with a plastic coating preferably an epoxy coating 30, in accordance with conventional practice, the coating 30 overlying and adhered to the portions of the main neck, kidney slot and shading coil as viewed in FIGS. 2 and 3.

A main coil or winding 31 is wound about each neck portion 20. As will be apparent from FIG. 2, because of the positioning of the shading coil slot and associated shading coil, the shading coil 27 is in series with the main pole neck portion 20 allowing room to reduce the distance between the kidney slots 26 at the neck portion 20. As a result, the wire can be wrapped around only the main neck portion 20 reducing the amount of wire necessary per mean turn without sacrificing the saturation level and therefore resulting in a more efficient motor.

In addition the windings of the main coil 31 about the neck portion 20 tend to span less of a circumferential arc around center 0. Thereby minimizing the tendency of the coil 31 to move radially inwardly toward the interface 23 and thereby lessening or eliminating the need for the conventional coil retaining pin 32 especially where a heavier wire is used and the number of poles increases.

As can be seen from FIG. 2, no portion of the main coil 31 overlies the axially outer ends 27A of the shading coil 27.

The invention has particular advantage where separate insulations such as mylar sheet or paper is utilized. Referring to FIGS. 5–7, the laminations 17 are of identical construction to those utilized in the stator described in connection with FIGS. 1–4 and are assembled in the same manner except that is utilizing an integral layer or coating 30 of epoxy, a separate paper type insulation 35 is provided about the kidney slots 26. The kidney slot insulation 35 insulates the magnetic wires of the coil 36 from any dead metal part in the kidney slot 26. As shown the insulation 35 separates the windings of the coil 36 from the shading coil 27. The extension of the insulation 35 axially beyond the endmost lamination insures the proper insulation, as required of the coil 36 from the laminations 17 (FIG. 7) and shading coil 27 to meet safety standards. As can be seen by FIG. 6 and 7 the end turns of main coil 36 do not axially overlie the axial outer ends of the shading coil 27, thereby insuring proper clearance between the main coil 36 and the axial ends of the shading coil 27 with less effort than required on conventional motor of similar type, for example using different laminations or specially designed insulators.

I claim:
1. A shaded pole electric motor comprising
   a rotor,
   a stator,
   said rotor and stator having an interface,
   said stator having a plurality of generally radially extending poles which extend toward the stator rotor interface,
   each said pole having a neck portion and a radially innermost end portion,
   said radially innermost end portion having a greater circumferential extent than the neck portion and terminating in pole tips,
   adjacent neck portions forming a kidney slot for receiving portions of windings,
   a main winding wound around the neck portion of each said pole,
   a shading coil slot in said radially innermost end of said pole adjacent one of said pole tips extending generally circumferentially and having opposed ends,
   the end of said shading coil slot which is further from said neck portion of said pole being spaced from said interface a distance not less than the distance that the other end of said shading coil slot is spaced from said interface,
   a shaded pole winding wound through said slot,
   said shading coil forming the shaded pole portion of said radially extending pole,
   substantially all portions of said main coil which are adjacent the shading coil being spaced radially from the portions of said shading coil which are on the axially outer ends of said stator such that none of said main coil overlies the axial ends of said shading coil.
2. The combination set forth in claim 1 wherein the end of said shading coil slot nearer the neck portion is spaced radially from the interface a lesser distance than the other end of said shaded pole slot.
3. The combination set forth in claim 2 wherein said end of said shaded pole slot which is nearer said neck portion extends to said interface.
4. The combination set forth in claim 1 wherein a radial line bisecting a line extending along the length of said shading coil slot forms an obtuse angle with that portion of said last-mentioned line which is further from said neck portion.
5. For use in a shaded pole electric motor
   a stator,
   said stator having a plurality of generally radially extending poles which extend radially inwardly,
   each said pole having a neck portion and a radially innermost end portion,
   said radially innermost end portion having a greater circumferential extent than the neck portion and terminating in pole tips,
   adjacent neck portions forming a kidney slot for receiving portions of windings,
   a main winding wound around the neck portion of each said pole,
   a shading coil slot in said radially innermost end of said pole adjacent one of said pole tips extending generally circumferentially and having opposed ends,
   the end of said shading coil slot which is further from said neck portion of said pole being spaced from said interface a distance not less than the distance that the other end of said shading coil slot is spaced from said interface,
   a shaded pole winding wound through said slot,
   substantially all portions of said main coil being spaced radially from the portions of said shading coil which are on the axially outer ends of said stator such that none of said main coils overlies the axial ends of said shading coil.
6. The combination set forth in claim 5 wherein the end of said shading coil slot nearer the neck portion is spaced radially from the interface a lesser distance than the other end of said shaded pole slot.
7. The combination set forth in claim 6 wherein said end of said shaded pole slot which is nearer said neck portions extends to said interface.
8. The combination set forth in claim 5 wherein a radial line bisecting a line extending along the length of said shading coil slot forms an obtuse angle with that portion of said last-mentioned line which is further from said neck portion.
9. A lamination for a shaded pole electric motor comprising
   a body of substantially uniformly thick material,
   said body having a plurality of generally radially extending poles which extend toward an interface,
   each said pole having a neck portion and a radially innermost end portion,
   said radially innermost end portion having a greater circumferential extent than the neck portion and terminating in pole tips,
   adjacent neck portions forming a kidney slot for receiving portions of a mass winding around each neck portion,
   a shading coil slot in said radially innermost end of said pole adjacent one of said pole tips extending generally circumferentially and having opposed ends,
   the end of said shading coil slot which is further from said neck portion of said pole being spaced from said interface a distance not less than the distance that the other end of said shading coil slot is spaced from said interface.
10. The combination set forth in claim 9 wherein the end of said shading coil slot nearer the neck portion is spaced radially from the interface a lesser distance than the other end of said shaded pole slot.

11. The combination set forth in claim 10 wherein said end of said shaded pole slot which is nearer said neck portions extends to said interface.

12. The combination set forth in claim 9 wherein a radial line bisecting a line extending along the length of said shading coil slot forms an obtuse angle with that portion of said last-mentioned line which is further from said neck portion.

13. A shaded pole electric motor comprising
a rotor,
a stator,
said rotor and stator having an interface,
said stator having a plurality of generally radially extending poles which extend toward the stator rotor interface,
each said pole having a neck portion and a radially innermost end portion,
said radially innermost end portion having a greater circumferential extent than the neck portion and terminating in pole tips,
adjacent neck portions forming a kidney slot for receiving portions of windings,
a main winding wound around the neck portion of each said pole,
a shading coil slot in said radially innermost end of said pole adjacent one of said pole tips extending generally circumferentially and having opposed ends,
the end of said shading coil slot which is further from said neck portion of said pole being spaced from said interface a distance not less than the distance that the other end of said shading coil slot is spaced from said interface,
a shaded pole winding wound through said slot,
said shading coil forming the shaded pole portion of said radially extending pole,
substantially all portions of said main coil which are adjacent the shading coil being spaced radially from the
portions of said shading coil which are on the axially outer ends of said stator such that none of said main coil overlies the axial ends of said shading coil,
the end of said shading coil slot nearer the neck portion being spaced radially from the interface a lesser distance than the other end of said shaded pole slot,
said end of said shaded pole slot which is nearer said neck portions extends to said interface,
a radial line bisecting a line extending along the length of said shading coil slot forming an obtuse angle with that portion of said last-mentioned line which is further from said neck portion.

14. For use in a shaded pole electric motor
a stator,
said stator having a plurality of generally radially extending poles which extend radially inwardly,
each said pole having a neck portion and a radially innermost end portion,
said radially innermost end portion having a greater circumferential extent than the neck portion and terminating in pole tips,
adjacent neck portions forming a kidney slot for receiving portions of windings,
a main winding wound around the neck portion of each said pole,
a shading coil slot in said radially innermost end of said pole adjacent one of said pole tips extending generally circumferentially and having opposed ends,
the end of said shading coil slot which is further from said neck portion of said pole being spaced from said interface a distance not less than the distance that the other end of said shading coil slot is spaced from said interface,
a shaded pole winding wound through said slot,
substantially all portions of said shading coil which are on the axially outer ends of said stator such that none of said main coils overlies the axial ends of said shading coil,
the end of said shading coil slot nearer the neck portion being spaced radially from the interface a lesser distance than the other end of said shaded pole slot,
said end of said shaded pole slot which is nearer said neck portions extending to said interface,
a radial line bisecting a line extending along the length of said shading coil slot forming an obtuse angle with that portion of said last-mentioned line which is further from said neck portion.

15. A shaded pole electric motor, whose stator, provided with main and shaded pole windings, is provided with a plurality of poles extending inwardly to the air gap, each of said poles having a pole neck and a pole shoe terminating in two pole tips, whereby a kidney-shaped area for receiving portions of windings is located between adjacent pole necks, and the main winding is wound around the associated pole neck of each pole, whereby in addition a shaded pole slot is arranged in the pole shoe located near one of the two pole tips, extends generally circumferentially around the stator hole, as opposed ends, of which one end is closer to the air gap, and contains the shaded pole winding, wherein the end of the shaded pole slot which is further from the pole neck is spaced radially at a distance from the air gap which is greater than that which the other end of the shaded pole slot is radially spaced from the air gap, and wherein all portions of the main winding are radially spaced from the shaded pole winding in such a manner that the end windings of the main winding do not overlie the end windings of the shaded pole winding.

16. The shaded pole motor set forth in claim 15 wherein the end of the shaded pole slot which is nearer to the pole neck extends to the air gap.

* * * * *